(12) United States Patent
Kondo

(10) Patent No.: US 11,643,148 B2
(45) Date of Patent: May 9, 2023

(54) VEHICLE BODY STRUCTURE

(71) Applicant: HONDA MOTOR CO., LTD., Tokyo (JP)

(72) Inventor: Takehiro Kondo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/532,488

(22) Filed: Nov. 22, 2021

(65) Prior Publication Data

US 2022/0161859 A1 May 26, 2022

(30) Foreign Application Priority Data

Nov. 25, 2020 (JP) .............................. JP2020-194958

(51) Int. Cl.
| | | |
|---|---|---|
| *B62D 25/20* | (2006.01) | |
| *B62D 21/15* | (2006.01) | |
| *B62D 25/02* | (2006.01) | |
| *B62D 25/08* | (2006.01) | |

(52) U.S. Cl.
CPC ....... *B62D 25/2018* (2013.01); *B62D 21/157* (2013.01); *B62D 25/025* (2013.01); *B62D 25/08* (2013.01)

(58) Field of Classification Search
CPC .... B62D 25/08; B62D 25/20; B62D 25/2018; B62D 21/15; B62D 21/152; B62D 21/155
USPC ....... 296/203.01–203.4, 204, 187.09, 187.11
See application file for complete search history.

(56) References Cited

U.S. PATENT DOCUMENTS

| | | | |
|---|---|---|---|
| 8,276,976 B2 * | 10/2012 | Yasuhara ............. | B62D 21/152 |
| | | | 296/203.02 |
| 10,137,934 B2 | 11/2018 | Nakamoto et al. | |
| 11,142,261 B2 * | 10/2021 | Nakauchi ........... | B62D 25/2036 |
| 2005/0077754 A1 | 4/2005 | Tomita | |

FOREIGN PATENT DOCUMENTS

| | | |
|---|---|---|
| JP | H04-50083 A | 2/1992 |
| JP | 2001-301645 A | 10/2001 |
| JP | 2005-112197 A | 4/2005 |

(Continued)

OTHER PUBLICATIONS

Japanese Office Action received in corresponding Japanese Application No. 2020-194958 dated Aug. 9, 2022 with English translation (5 pages).

*Primary Examiner* — Dennis H Pedder
(74) *Attorney, Agent, or Firm* — Rankin, Hill & Clark LLP

(57) ABSTRACT

A vehicle body structure includes: a supported frame disposed frontward or rearward of a vehicle cabin along a longitudinal direction of a vehicle; a support frame disposed on an outer peripheral surface of the vehicle cabin along the longitudinal direction of the vehicle and configured to support an end portion of the supported frame closer to the vehicle cabin; a stiffener disposed in the support frame along the longitudinal direction of the vehicle and configured to form a closed cross-section with the support frame; and a bulkhead disposed in the support frame, adjacent to a portion of the stiffener closer to the supported frame, and facing the longitudinal direction of the vehicle. An upper edge portion of the bulkhead is integrally formed as a single piece with an end portion of the stiffener closer to the supported frame.

3 Claims, 4 Drawing Sheets

(56) References Cited

FOREIGN PATENT DOCUMENTS

| | | | |
|---|---|---|---|
| JP | 2007-296932 A | 11/2007 | |
| JP | 2015-151053 A | 8/2015 | |
| JP | 2017-121883 A | 7/2017 | |
| WO | WO-2018016173 A1 * | 1/2018 | ........... B62D 21/152 |

* cited by examiner

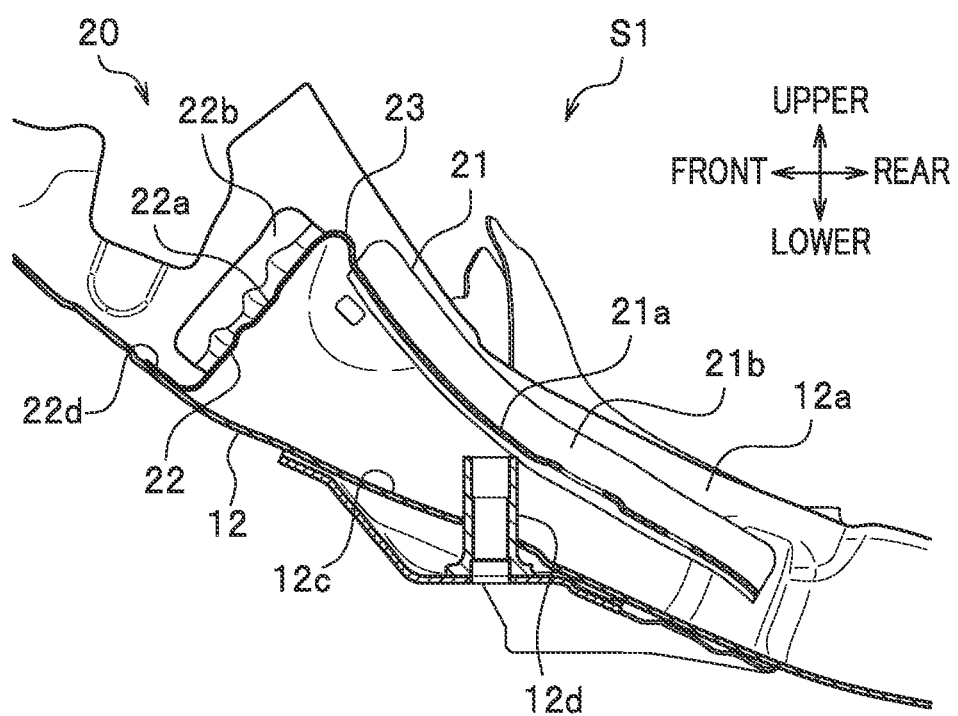

VEHICLE BODY STRUCTURE

CROSS-REFERENCE TO RELATED APPLICATION

This application claims the benefit of foreign priority to Japanese Patent Application No. 2020-194958, filed on Nov. 25, 2020, which is incorporated by reference in its entirety.

TECHNICAL FIELD

The present invention relates to a vehicle body structure for protecting occupants in a vehicle cabin from excessive loads applied from outside.

BACKGROUND

To protect occupants in a vehicle cabin from an excessive input load such as a collision, an impact absorbing structure for absorbing an excessive input load has been conventionally known. Also, a framework structure for preventing the interior space of the vehicle cabin from deforming against an impact has been conventionally known. These structures have been employed in various parts of a vehicle body.

For example, Japanese Patent Laid-open Publication No. 2017-121883 discloses a configuration in which a rear frame (support frame) provided along a front lower surface of the vehicle cabin supports in a cantilevered fashion a rear end portion of a front frame (supported frame) extending from the vehicle cabin.

When an excessive external load is applied to the front frame, the front frame collapses to absorb a load energy, thereby suppressing a deformation of the vehicle cabin and protecting occupants in the vehicle cabin.

In a vehicle employing the above-described conventional structures, when a load is applied to the front frame (supported frame) due to a collision, a portion between the front frame and the rear frame (support frame) for supporting the front frame may buckle before the front frame collapses. In such a case, the front frame may not be able to sufficiently absorb energy.

In view of the above, the present invention seeks to provide a vehicle body structure which can prevent a portion between the supported frame and the support frame for supporting the supported frame from inadvertently buckling when an excessive load is applied from outside.

SUMMARY

In view of the above, an object of the present invention is to provide a vehicle body structure comprising: a supported frame disposed frontward or rearward of a vehicle cabin along a longitudinal direction of a vehicle; a support frame disposed on an outer peripheral surface of the vehicle cabin along the longitudinal direction of the vehicle and configured to support an end portion of the supported frame closer to the vehicle cabin; a stiffener disposed in the support frame along the longitudinal direction of the vehicle and configured to form a closed cross-section with the support frame; and a bulkhead disposed in the support frame, adjacent to a portion of the stiffener closer to the supported frame, and facing the longitudinal direction of the vehicle. An upper edge portion of the bulkhead is integrally formed as a single piece with an end portion of the stiffener closer to the supported frame.

BRIEF DESCRIPTION OF THE DRAWINGS

The drawings described herein are for illustration purposes only and are not intended to limit the scope of the present invention in any way.

FIG. 6 is a cross-sectional view of a vehicle body structure according to a second embodiment, which shows a portion corresponding to that taken along the line III-III of FIG. 2.

DETAILED DESCRIPTION

First Embodiment

Figure 1:
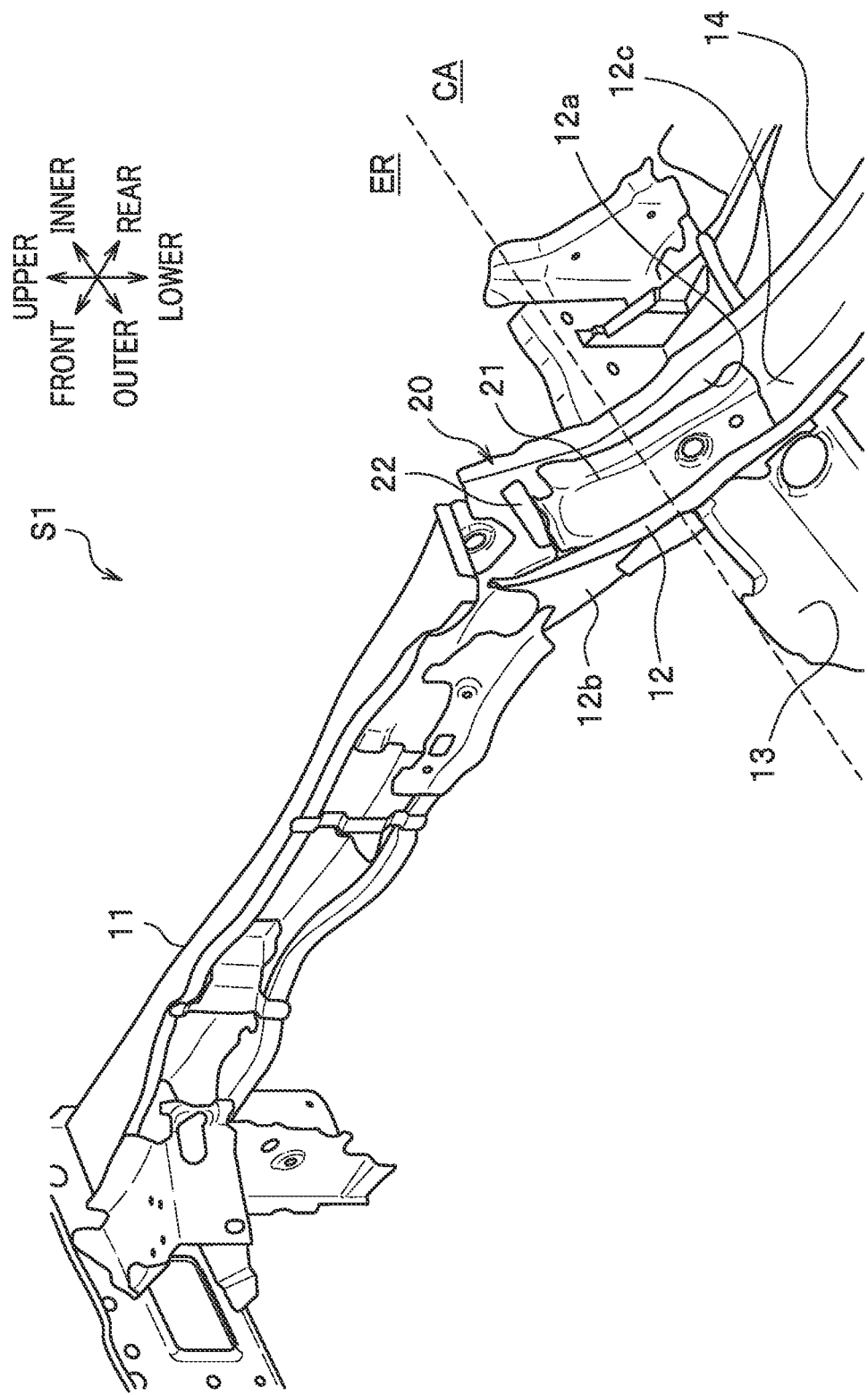
FIG. 1 is a perspective view of a vehicle body structure according to a first embodiment.

A vehicle body structure S1 according to one embodiment of the present invention will be described in detail with reference to FIGS. 1 to 5. In the description, the same elements are denoted by the same reference numerals and redundant explanation thereof will be omitted.

In the following description, front, rear, upper, lower, inner, and outer directions refer to, unless otherwise stated, front and rear directions in a longitudinal direction (i.e., front-rear direction) of a vehicle, upper and lower directions in a vertical direction (i.e., upper-lower direction) of the vehicle, and inner and outer directions in a vehicle width direction (i.e., lateral direction or right-left direction) of the vehicle.

As seen in FIG. 1, a vehicle body structure S1 according to this embodiment is provided at a connecting portion between an engine room ER disposed frontward of a vehicle cabin CA and the vehicle cabin CA.

The vehicle body structure S1 of this embodiment is a structure for protecting occupants in the vehicle cabin CA mainly in the event of a frontal collision with another vehicle coming from a front side and an oblique front side of the vehicle body.

The vehicle body structure S1 of this embodiment includes, as components for constituting a framework of the vehicle body, a front side frame 11 (supported frame), a front side rear end 12 (support frame), an outrigger 13, and a floor side frame 14.

A pair of front side frames 11 (supported frames) are arranged in the engine room ER at a right side and a left side thereof along the longitudinal direction (see FIG. 1).

Each front side frame 11 has a U-shaped cross-section and is disposed such that a U-shaped opening of the front side frame 11 opens toward a laterally outer side in the vehicle width direction.

In other words, the pair of front side frames 11 are arranged such that bottom portions of the U-shape are facing each other.

According to the vehicle body structure S1 of this embodiment, each front side frame 11 has a U-shaped cross-section and the inner side of the frame is open to the outside. However, the present invention is not limited to this specific form. For example, a back plate (not shown) may be placed over the U-shaped opening of the front side frame 11 to form a closed cross-section together with the back plate.

Each front side frame 11 has a front side rear end 12 formed at its rear end portion, and is disposed frontward of the vehicle cabin CA through the front side rear end 12.

As seen in FIG. 1, the front side rear end 12 (support frame) extends toward the rear side of the vehicle body along an underside of a dashboard lower (not shown). The dashboard lower constitutes an outer shell of the vehicle cabin CA.

The front side rear end 12 is connected to a front end portion of a floor side frame 14, while supporting a rear end portion of the front side frame 11.

To be more specific, the front side rear end 12 extends downward from the front side toward the rear side thereof and is configured to connect the front side frame 11 to the floor side frame 14.

Further, the front side rear end 12 has a U-shaped cross-section consisting of a rear end inner wall 12a, a rear end outer wall 12b, and a rear end bottom surface 12c. The front side rear end 12 is located with an opening thereof facing upward.

According to the vehicle body structure S1 of this embodiment, the front side rear end 12 has a U-shaped cross-section and is located to open upward. However, the present invention is not limited to this specific form. For example, an upper plate (not shown) may be placed over the U-shaped opening of the front side rear end 12 to form a closed cross-section together with the upper plate.

Figure 2:
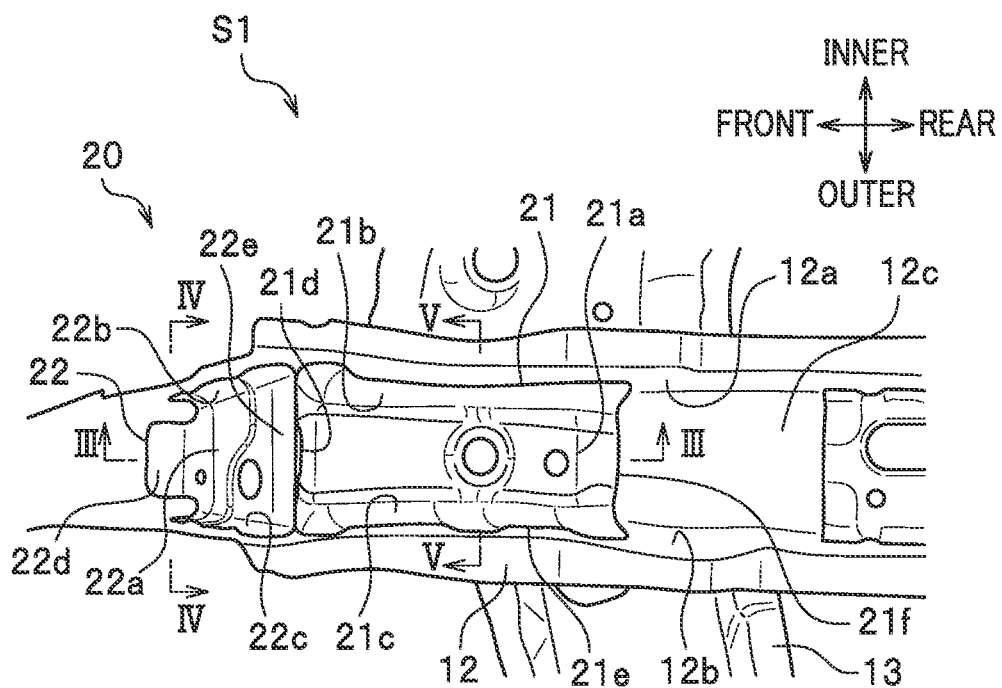
FIG. 2 is an enlarged plan view of a main portion of the vehicle body structure.

As seen in FIGS. 1 and 2, the rear end inner wall 12a constitutes a laterally inner wall of the U-shaped cross-section of the front side rear end 12.

The rear end inner wall 12a rises upward in the vertical direction and extends in the longitudinal direction while facing in the vehicle width direction.

The rear end outer wall 12b constitutes a laterally outer wall of the U-shaped cross-section of the front side rear end 12.

The rear end outer wall 12b rises upward in the vertical direction and extends parallel to the rear end inner wall 12a in the longitudinal direction while facing in the vehicle width direction.

The rear end bottom surface 12c extends in the longitudinal direction while facing upward and downward and connects a lower end portion of the rear end inner wall 12a and a lower end portion of the rear end outer wall 12b.

Figure 3:
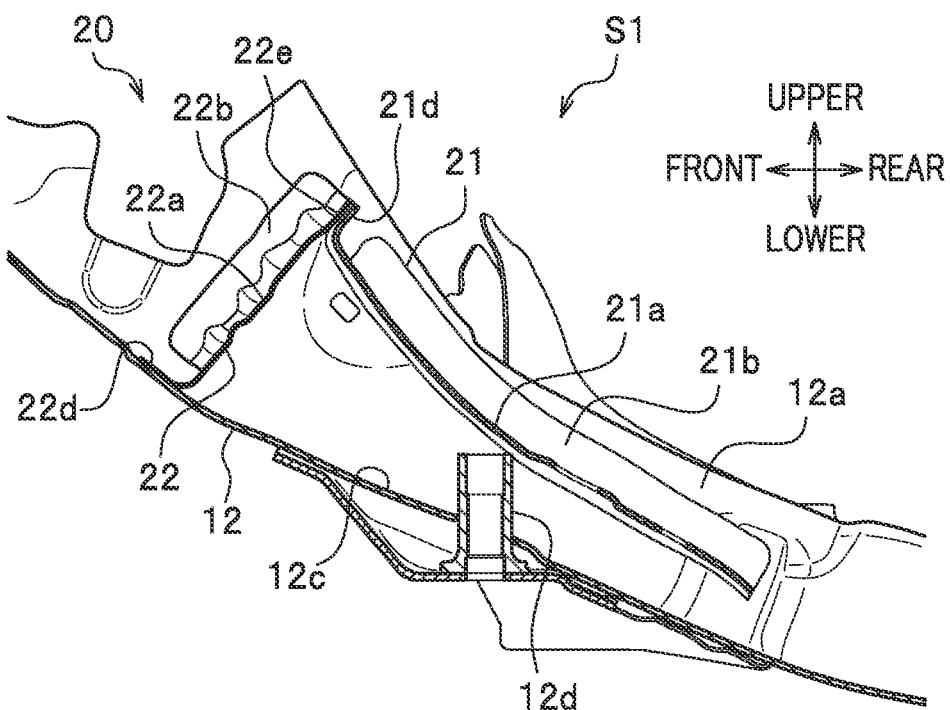
FIG. 3 is a cross-sectional view taken along the line III-III of FIG. 2.
Figure 4:
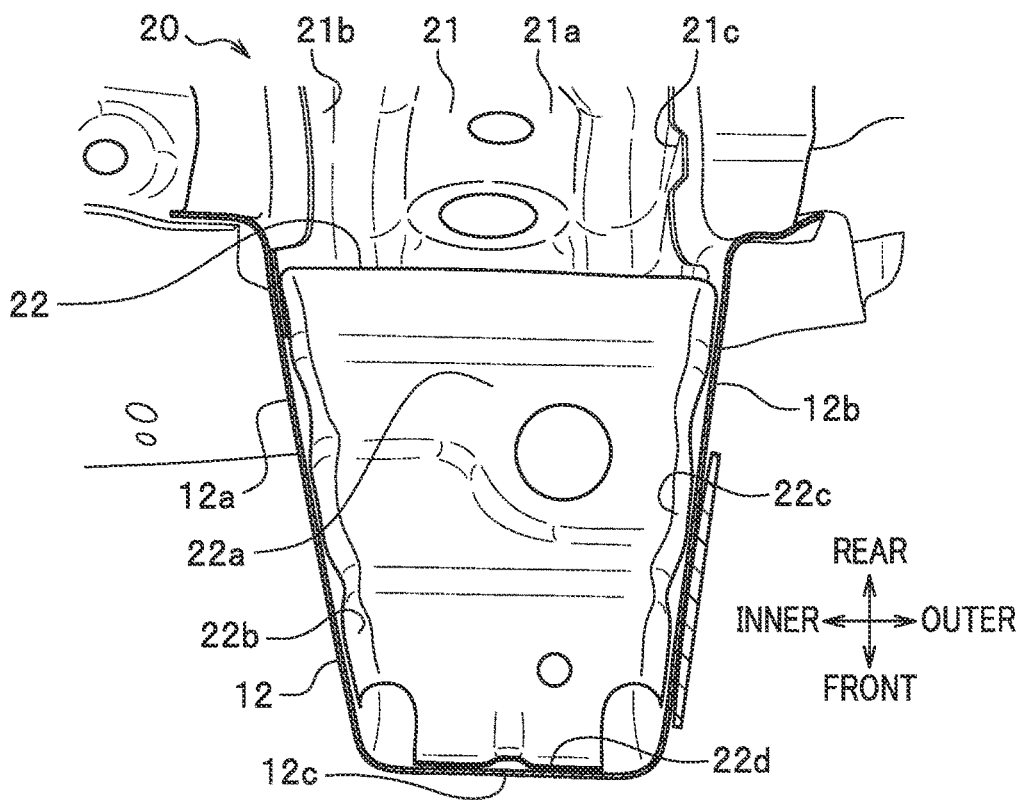
FIG. 4 is a cross-sectional view taken along the line IV-IV of FIG. 2.
Figure 5:
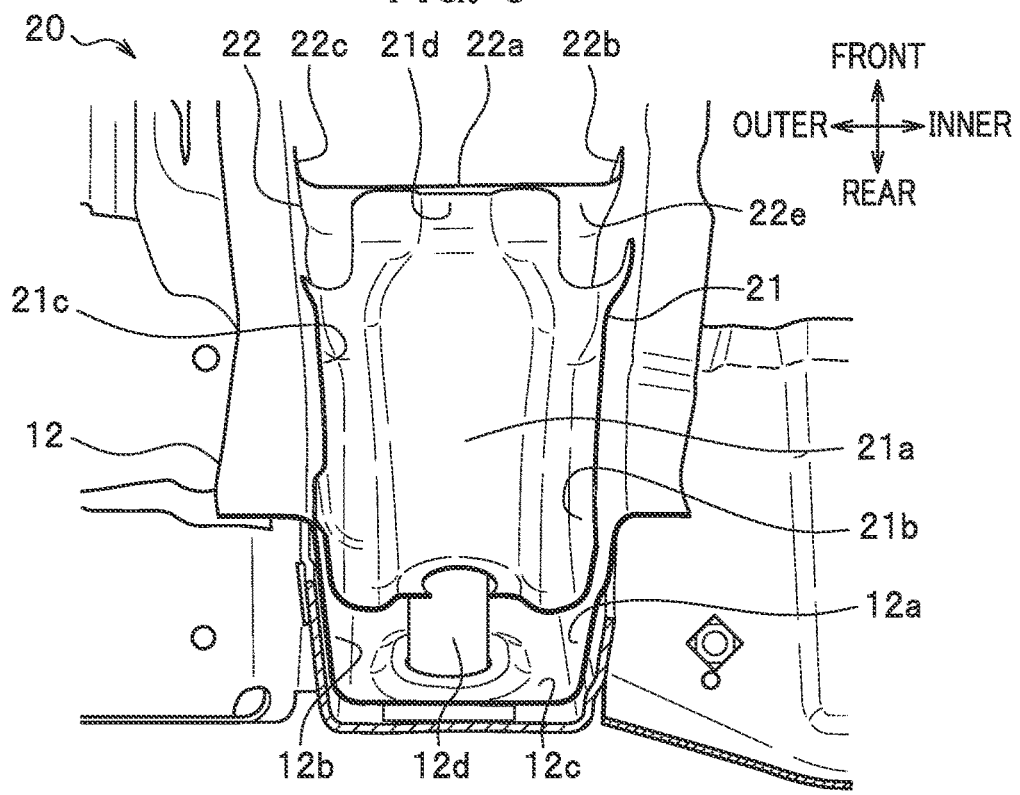
FIG. 5 is a cross-sectional view taken along the line V-V of FIG. 2.

As seen in FIG. 3, the rear end bottom surface 12c has a fastening point 12d, by which a suspension lower arm (not shown) for supporting a wheel (not shown) is supported.

The front side rear end 12 has opening-side edge portions of the U-shaped cross-section, and the opening-side edge portions are joined to the underside of the dashboard lower.

Accordingly, the front side rear end 12, together with the dashboard lower, can provide a closed cross-section extending in the longitudinal direction of the vehicle body.

Further, a reinforcement member 20 to be described later is disposed inside the front side rear end 12 having the U-shaped cross-section.

An outrigger 13 is connected to the front side rear end 12.

As seen in FIG. 1, the outrigger 13 is disposed under a front underside of the vehicle cabin CA and extends in the vehicle width direction.

The outrigger 13 has an inner end portion connected to the front side rear end 12 and an outer end portion connected to a side sill (not shown) that is a framework member for constituting a side portion of the vehicle cabin CA.

The outrigger 13 has a U-shaped cross-section and is located to open upward. The outrigger 13 has opening-side edge portions of the U-shaped cross-section, and the opening-side edge portions are joined to the underside of the dashboard lower.

Accordingly, the outrigger 13, together with the dashboard lower, can provide a closed cross-section extending in the vehicle width direction.

A pair of right and left floor side frames 14 are arranged between a floor tunnel portion (not shown) and the side sills (not shown) and extend in the longitudinal direction (see FIG. 1).

The floor tunnel portion (not shown) extends frontward and rearward at a laterally central portion of a vehicle cabin floor in the vehicle width direction. The side sills (not shown) are framework members extending in the longitudinal direction along side edges of the vehicle cabin floor.

The floor side frame 14 has a U-shaped cross-section and is located to open upward.

Accordingly, the floor side frame 14, together with the dashboard lower, can provide a closed cross-section extending in the vehicle width direction.

As seen in FIGS. 1 and 2, the reinforcement member 20 is disposed inside the front side rear end 12 having the U-shaped cross-section to increase the rigidity of the front side rear end 12.

The reinforcement member 20 includes a stiffener 21 and a bulkhead 22.

As seen in FIGS. 2 to 5, the stiffener 21 includes a stiffener body 21a, a stiffener inner contact piece 21b, a stiffener outer contact piece 21c, and a stiffener front contact piece 21d.

The stiffener body 21a is composed of a generally rectangular-shaped plate member. The stiffener body 21a is disposed spaced apart from the rear end bottom surface 12c with its long sides 21e extending in the longitudinal direction and with its short sides 21f extending in the vehicle width direction.

As seen in FIG. 3, the stiffener body 21a is disposed such that a front end portion thereof is located in proximity to a joint portion of the front side frame 11 and the front side rear end 12, while a central portion thereof is located right above the fastening point 12d.

Further, the stiffener body 21a is disposed such that a front end thereof is located in proximity to an opening side of the U-shaped cross-section of the front side rear end 12, while a rear end thereof is located in proximity to the rear end bottom surface 12c of the front side rear end 12.

In other words, the stiffener body 21a extends downward from the front side toward the rear side thereof.

The stiffener inner contact piece 21b is formed of a rectangular-shaped piece extending upward from an inner side edge portion of the stiffener body 21a. The stiffener inner contact piece 21b is joined to the rear end inner wall 12a of the front side rear end 12.

The stiffener outer contact piece 21c is formed of a rectangular-shaped piece extending upward from an outer side edge portion of the stiffener body 21a. The stiffener outer contact piece 21c is joined to the rear end outer wall 12b of the front side rear end 12. The stiffener front contact piece 21d (mounting portion) is formed of a rectangular-shaped piece extending upward from a front edge portion of the stiffener body 21a along a plate surface of the bulkhead 22. The stiffener front contact piece 21d is joined to a bulkhead joint portion 22e to be described later.

With this configuration, the stiffener 21 is disposed along the longitudinal direction of the vehicle, while closing the opening side of the U-shaped cross-section of the front side rear end 12 (support frame), thereby providing a closed cross-section within the front side rear end 12. Further, the closed cross-section formed by the front side rear end 12 and the dashboard lower is divided by the stiffener 21 into two (upper and lower) closed cross-sections.

The bulkhead 22 is formed of a separate member from the stiffener 21. As seen in FIGS. 2 to 5, the bulkhead 22 is disposed adjacent to the front side of the stiffener 21 (closer to the front side frame 11), facing the longitudinal direction of the vehicle.

The bulkhead 22 includes a bulkhead body 22*a*, a bulkhead inner contact piece 22*b*, a bulkhead outer contact piece 22*c*, and a bulkhead bottom contact piece 22*d*.

The bulkhead body 22*a* is composed of a plate member having the same shape as the U-shape of the front side rear end 12. The bulkhead body 22*a* is disposed such that a plate surface thereof faces the longitudinal direction to pass across the front side rear end 12.

The bulkhead body 22*a* has upper side edge portions serving as the bulkhead joint portion 22*e*.

The bulkhead inner contact piece 22*b* is formed of a rectangular-shaped piece extending frontward from an inner side edge portion of the bulkhead body 22*a*. The bulkhead inner contact piece 22*b* is joined to the rear end inner wall 12*a* of the front side rear end 12.

The bulkhead outer contact piece 22*c* is formed of a rectangular-shaped piece extending frontward from an outer side edge portion of the bulkhead body 22*a*. The bulkhead outer contact piece 22*c* is joined to the rear end outer wall 12*b* of the front side rear end 12.

The bulkhead bottom contact piece 22*d* is formed of a rectangular-shaped piece extending frontward from a lower edge portion of the bulkhead body 22*a*. The bulkhead bottom contact piece 22*d* is joined to the rear end bottom surface 12*c* of the front side rear end 12.

The bulkhead joint portion 22*e* serves as a portion to be joined together with the stiffener front contact piece 21*d*, and is provided on an upper edge portion of the bulkhead body 22*a* along the vehicle width direction.

The bulkhead joint portion 22*e* is disposed inside the front side rear end 12 (support frame) having the U-shaped cross-section and joined to the stiffener front contact piece 21*d*.

The bulkhead joint portion 22*e* and the stiffener front contact piece 21*d* are joined together, so that the stiffener 21 and bulkhead 22 form a generally L-shaped cross-section.

With this configuration, the bulkhead 22 is disposed inside the front side rear end 12 (supported frame) having the U-shaped cross-section, adjacent to a portion of the stiffener 21 closer to the front side frame 11 (supported frame) and facing the longitudinal direction of the vehicle.

Further, the bulkhead joint portion 22*e* (upper edge portion of the bulkhead 22) is joined together with the stiffener front contact piece 21*d* (mounting portion) that is provided on an end portion of the stiffener 21 closer to the front side frame 11 (supported frame).

The vehicle body structure S1 according to this embodiment is configured such that the stiffener 21 is disposed in the front side rear end 12 (support frame) along the longitudinal direction of the vehicle and forms a closed cross-section within the front side rear end 12.

Further, the bulkhead 22 is disposed inside the front side rear end 12, adjacent to the front end portion of the stiffener 21 and facing the longitudinal direction of the vehicle.

Further, the bulkhead joint portion 22*e* of the bulkhead 22 and the stiffener front contact piece 21*d* of the stiffener 21 are joined together into a single piece.

When an impact load is applied to the vehicle body structure S1 configured as described above from the front side and the diagonal front side of the vehicle due to a rear-end collision or a frontal collision of the vehicle, the impact load is transmitted from the front side frame 11 to the front side rear end 12.

The load applied to the bulkhead 22 is received by the stiffener 21 at the upper portion of the bulkhead 22. This makes it possible to efficiently receive the load applied to the direction where the frame buckles, so that an inadvertent buckling occurred between the front side frame 11 and the front side rear end 12 can be suppressed.

Further, since a closed cross-section is formed with the rear end bottom surface 12*c* of the front side rear end 12, an inadvertent buckling can be suppressed further.

According to the configuration of this embodiment in which the front side rear end 12 has a U-shaped cross-section opening toward upward, an impact load acts on the front side rear end 12 in such a way that the opening side of the U-shaped cross-section collapses inward or expands outward and that the front side frame 11 buckles upward.

However, since the vehicle body structure S1 according to this embodiment is equipped with the stiffener 21, a closed space is formed inside the front side rear end 12 having the U-shaped cross-section.

This can increase the rigidity of the front side rear end 12 and prevent a deformation at the opening side of the U-shaped cross-section and an upward bucking of the front side frame 11.

When an impact load is applied to the wheels (not shown) from the side of the vehicle due to a collision to the side of the vehicle body, the impact load is transmitted from the wheels to the fastening point 12*d* of the front side rear end 12 via the suspension lower arm (not shown).

The impact load acts on the front side rear end 12 in such a way that the fastening point 12*d* slides laterally inward in the vehicle width direction and that the U-shaped cross-section of the front side rear end 12 collapses laterally inward in the vehicle width direction.

However, since the vehicle body structure S1 according to this embodiment is equipped with the bulkhead 22, it is possible to prevent the fastening point 12*d* from sliding laterally inward in the vehicle width direction.

Further, since the stiffener 21 and the bulkhead 22 are integrally formed as a single piece, the rigidity of the front side rear end 12 can be increased further to thereby further suppress buckling and collapsing.

According to this embodiment, the vehicle body structure S1 can prevent a portion between the front side frame 11 (supported frame) and the front side rear end 12 (support frame) for supporting the front side frame 11 (supported frame) from inadvertently buckling when an excessive load is applied from outside.

The vehicle body structure S1 according to this embodiment is configured such that the stiffener 21 and the bulkhead 22 are formed as separate members and joined together into a single piece.

This makes it possible to easily form the reinforcement member 20, in which the stiffener 21 and the bulkhead 22 are integrated together.

On the other hand, if the stiffener 21 and the bulkhead 22 are formed of a single plate member, a further process is required such that a bending process is applied at a seam between the stiffener 21 and the bulkhead 22 to form a generally L-shaped cross-section.

However, this bending process may cause an L-shaped corner portion to be ripped open according to an angle at the seam.

According to the configuration of this embodiment in which the stiffener 21 and the bulkhead 22 are formed as separate members and, when mounted, joined together into a single piece, the stiffener 21 and the bulkhead 22 can be integrated without being ripped open at the seam between stiffener 21 and bulkhead 22.

Further, since the stiffener 21 and the bulkhead 22 are formed as separate members, the stiffener 21 and the bulkhead 22 can be joined together after they are placed separately in the front side rear end 12.

Accordingly, even if the cross-sectional shape of the front side rear end 12 is complicated and it is difficult to install the front side rear end 12 after the stiffener 21 and the bulkhead 22 are assembled together, the reinforcement member 20 can be installed.

Further, the vehicle body structure S1 according to this embodiment is configured such that the stiffener 21 includes the stiffener front contact piece 21d (mounting portion) provided on its end portion closer to the front side frame 11 (supported frame); the stiffener front contact piece 21d is formed to extend upward while extending along the plate surface of the bulkhead 22.

With this configuration, after placing the stiffener 21 and the bulkhead 22 separately in the front side rear end 12, the stiffener front contact piece 21d and the bulkhead joint portion 22e can be joined together from the U-shaped opening side of the front side rear end 12.

This makes it possible to join the stiffener 21 and the bulkhead 22 without interfering with the front side rear end 12.

According to this embodiment, spot welding is used to join the bulkhead joint portion 22e and the stiffener front contact piece 21d together. However, the present invention is not limited to this specific configuration using spot welding. For example, various joint methods such as other welding methods, bolts, and rivets may be used, where appropriate, depending on the magnitude of expected input loads.

Second Embodiment

With reference to FIG. 6, a second embodiment of the present invention will be described below.

In the following description, like or similar elements to those described in the first embodiment are denoted by the same reference numerals and the detailed description thereof will be omitted.

A vehicle body structure S2 according to this embodiment is different from the above-described vehicle body structure S1 according to the first embodiment in that the stiffener 21 and the bulkhead 22 that constitute the reinforcement member 20 are formed of a single member.

According to the second embodiment, the stiffener 21 and the bulkhead 22 form a continuous member through a connecting portion 23.

The connecting portion 23 has one end that is continuous with the front edge portion of the stiffener body 21a and the other end that is continuous with the upper edge portion of the bulkhead body 22a.

The connecting portion 23 forms a curved surface made by a plurality of consecutive circular arcs.

The vehicle body structure S2 configured as described above can also provide the same advantageous effects as those described in the first embodiment.

According to the configuration of this embodiment, when the reinforcement member 20 is placed on the front side rear end 12, the stiffener 21 and the bulkhead 22 can be positioned with ease.

What is claimed is:

1. A vehicle body structure comprising:
a supported frame disposed frontward or rearward of a vehicle cabin along a longitudinal direction of a vehicle;
a support frame disposed on an outer peripheral surface of the vehicle cabin along the longitudinal direction of the vehicle and configured to support an end portion of the supported frame closer to the vehicle cabin;
a stiffener disposed in the support frame along the longitudinal direction of the vehicle and configured to form a closed cross-section with the support frame; and
a bulkhead disposed in the support frame, adjacent to a portion of the stiffener closer to the supported frame, and facing the longitudinal direction of the vehicle, wherein
an upper edge portion of the bulkhead is integrally formed as a single piece with an end portion of the stiffener closer to the supported frame.

2. A vehicle body structure comprising:
a supported frame disposed frontward or rearward of a vehicle cabin along a longitudinal direction of a vehicle;
a support frame disposed on an outer peripheral surface of the vehicle cabin along the longitudinal direction of the vehicle and configured to support an end portion of the supported frame closer to the vehicle cabin;
a stiffener disposed in the support frame along the longitudinal direction of the vehicle and configured to form a closed cross-section with the support frame; and
a bulkhead disposed in the support frame, adjacent to a portion of the stiffener closer to the supported frame, and facing the longitudinal direction of the vehicle, wherein
the bulkhead is a separate member from the stiffener, and an upper edge portion of the bulkhead is joined with an end portion of the stiffener closer to the supported frame.

3. The vehicle body structure according to claim 2, wherein
the stiffener comprises a mounting portion rising upward at the end portion of the stiffener closer to the supported frame.

* * * * *